May 25, 1937.  F. VISSER'T HOOFT ET AL  2,081,343
EDIBLE PRODUCT
Filed May 29, 1934
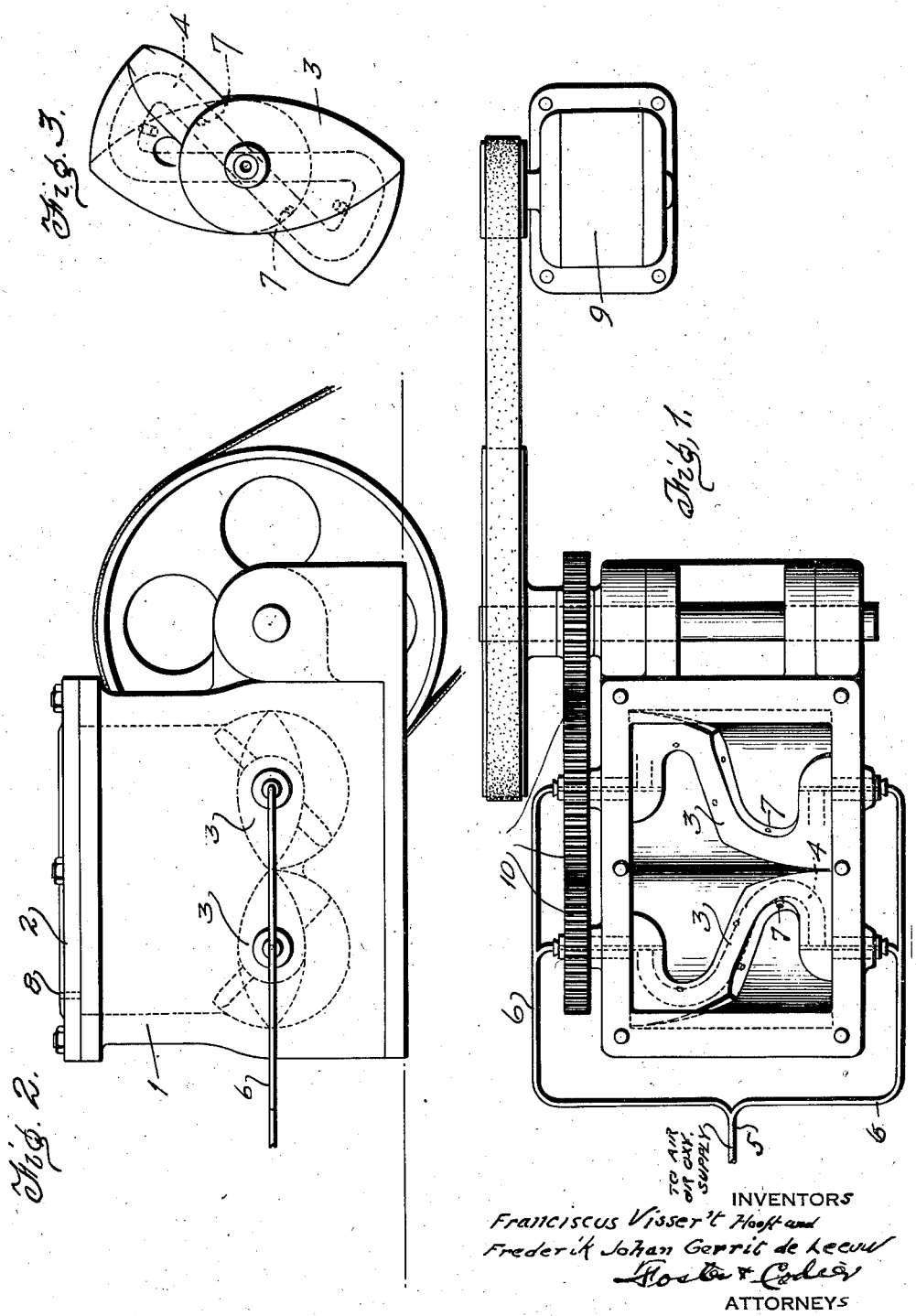
INVENTORS
Franciscus Visser't Hooft and
Frederik Johan Gerrit de Leeuw
ATTORNEYS Patented May 25, 1937

2,081,343

UNITED STATES PATENT OFFICE 2,081,343

EDIBLE PRODUCT

Franciscus Visser't Hooft and Frederik Johan Gerrit de Leeuw, Buffalo, N. Y., assignors to Lucidol Corporation, Buffalo, N. Y., a corporation of Delaware Application May 29, 1934, Serial No. 728,162

11 Claims. (Cl. 99—90)

The present invention relates to improved edible products.

More specifically the invention relates to improvements in the manufacture of bread, cake, rolls, pastry, biscuits, doughnuts and the like.

We have found that the highly pleasant and appetizing natural flavor of yeast leavened products is partly due to the presence of acetyl methyl carbinol.

We have also found that the flavor of any of the above named food products may be improved by producing in situ or adding to the said products, during the manufacture thereof, acetyl methyl carbinol.

One object of the present invention is to so adjust the relative amounts of the ingredients as to produce acetyl methyl carbinol during the fermentation of bread dough.

Another object of the present invention is to produce edible products of the kind herein described by actually adding to the dough or batter a quantity of acetyl methyl carbinol.

Another object of the present invention is to not only produce this compound in situ or add it, but also to take steps in the manufacture of bread to prevent the reduction of the said compound to 2.3 butylene glycol.

In order to simplify the present explanation of our invention, reference is made to what we term "flavor figure", by which is meant the number of milligrams of acetyl methyl carbinol per 150 grams of dough or 100 grams of bread crumbs. For instance 60 milligrams of acetyl methyl carbinol in an ordinary commercial 450 gram loaf of bread, is considered a high flavor figure. We realize that other ingredients contribute to the flavor of bread and of course are not within the scope of the above term.

We have found that by adjusting the common ingredients in the proper ratio, we may promote the formation of acetyl methyl carbinol in a bread dough, and at the same time prevent its reduction to 2—3 butylene glycol. Exemplifying this feature of our invention, we may first prepare a sponge or slack dough by mixing 55 pounds of flour, 34 pounds of water, 2 pounds of yeast and 1 pound of malt extract. After proper fermentation this sponge is made up into a dough by adding 45 pounds of flour, 25 pounds of water, 2 pounds of salt, 1 pound of malt extract, 2 pounds of shortening and 4 pounds of sugar. Other examples of sponge and dough composition will be readily apparent to those skilled in the art.

The sponge and dough may be handled in the usual manner, except that special steps are taken to increase the oxygen concentration in the sponge or dough. A preferred method which we call superaeration is by blowing air or oxygen into the sponge and/or dough during the mixing operation. Another method is by vigorous mixing or kneading in dough mixers which expose an extra large surface of dough to the air. Such dough mixers can be of the open or the closed type. When of the closed type they can be filled with oxygen or air under pressure which increases again the amount of oxygen available for action on the dough. Our preferred method, however, is superaeration, that is blowing of air or oxygen into the sponge and/or dough. This method is to be preferred because it does not necessitate the vigorous kneading and mixing of the other methods, which have a tendency to break up the gluten and so spoil the dough.

An example of a mixer which is suitable for superaerating sponge and/or dough is illustrated in the accompanying drawing.

Referring to the drawing, Figure I represents a plan view of our improved mixing device with the cover removed, Figure II represents a side view of the same, while Figure III represents an end view of a perforated mixing arm.

Throughout the several views similar reference characters refer to similar parts. I indicates the casing forming the receptacle or mixing chamber of the device, while 2 represents a cover. Rotary mixing arms 3 are provided with wide channels 4 which communicate with air or oxygen intake line 5 by branch lines 6 and with the interior of the mixing chamber by narrow channels 7 as shown. The device is vented at 8.

In operating the device, the sponge or dough is placed in the mixing chamber, the cover is placed in position, air or oxygen from any convenient source is introduced into the system at 5 and the mixing arms 3 are made to turn in opposite directions by starting the motor 9 which drives the set of gears 10.

Other apparatus falling within the scope of the above described mixing device may be used and the suitability of such apparatus as well as modifications of the above device will be readily apparent to those skilled in the art.

The sponge and dough when subjected to the mixing operation in the above device are thoroughly aerated by leading through air or oxygen at a pressure greater than atmospheric, that is to say, the conditions prevailing in the said mixer insure a plentiful supply of air or oxygen to all portions of the sponge or dough during the mixing operation, and we have found that this thorough aeration of the sponge and dough has a very favorable influence on the flavor of the bread baked from such aerated sponge and/or dough.

Bread baked from dough handled in the above manner will show a higher "flavor figure" than bread baked from the same composition of ingredients, but without using air or oxygen in the above manner. Our tests showed improvements of 30 to 40% in flavor figure where air or oxygen were employed under the above conditions.

We have further found that other conditions favorably influence the flavor of the bread and we have grouped these together (including aeration) in the below tabular view, under the heading:

*Conditions favorably influencing the "flavor figure"*

(1) Aeration of sponge and/or dough (previously described).

(2) Use of a high sugar yeast ratio. Thus a ratio of 2 parts (by weight) of sugar to 1 part of yeast is to be preferred over ratios such as 1—1 or 1—2, respectively. Also use of diastase preparations which increase the amount of sugar available is conducive of good results.

(3) Low fermentation temperatures such as 78° F., give better results than higher temperatures such as 84° F.

(4) A shorter fermentation time will have a favorable effect. A period of 1½ hours gives better results than 3 or 4 hours.

(5) Sponge dough method gives better results than straight dough method when using the same ingredients.

(6) Addition of hydrogen acceptors which prevent or minimize over reduction of acetyl methyl carbinol is favorable. Examples of such hydrogen acceptors or oxidizing agents (beside oxygen or air) are potassium bromate, ammonium persulfate, hydrogen peroxide, diacyl peroxides, etc., all substances now commonly used as flour or dough improvers in the usual manner as now used in milling and baking practice.

(7) It is important to select a type of yeast which gives a high "flavor figure" in a preliminary test run on a standard formula.

Another feature of our invention resides in the actual addition of acetyl methyl carbinol to the sponge, dough or batter. We are aware, of course, that other investigators have proposed the addition of diketones, such as diacetyl, to bakery products during the process of manipulating the dough or batter, for the purpose of improving the odor and flavor of the finished food product. We have found that the action of the yeast during dough fermentation reduces the small quantities of diacetyl which prior investigators have added, to 2—3 butylene glycol, which substance is without value for improving the flavor of the bread baked from such dough. We have overcome this disadvantageous reduction by various means which will be subsequently explained more fully. Our experience has also been that during the subsequent baking of the dough or batter, any diacetyl still present in the dough or batter is mostly lost by volatilization during the baking process, since this compound boils at about 88° C. Acetyl methyl carbinol on the other hand has a boiling point of about 142° C., and is not therefore driven off during the baking of the dough or batter.

We have found that incorporating say ½ to 1½ ounces of a 10% (by weight) aqueous solution of acetyl methyl carbinol in 100 pounds of cake batter gives excellent results. We have also found that using 1 to 3 ounces or even more of the above aqueous solution of acetyl methyl carbinol in 100 pounds of bread dough likewise gives excellent results. These above examples are purely illustrative and it is to be understood that numerous other proportions may be used, depending on the composition of the dough or batter and other factors.

In this feature of our invention and in the case of a yeast leavened product, the items previously enumerated under "Conditions favorably influencing the 'flavor figure'" may be observed to give improved results. The control of these factors is essential for the success of the process so as to eliminate overreduction of diacetyl or acetyl methyl carbinol, which compounds have been added in small quantities to yeast leavened food products to improve the flavor of products baked therefrom. The addition of small quantities of such compounds for flavoring purposes to yeast leavened dough, serves no useful purpose, unless the said factors are carefully controlled.

We have further found that certain samples of commercial yeasts produce acetyl methyl carbinol in dough during the fermentation thereof in appreciable quantities, while other yeasts produce very little acetyl methyl carbinol under the same conditions. We have devised a method of selecting the yeast most suitable for bread leavening purposes by determining the "flavor figure" of a dough or bread leavened with said yeasts. The method comprises compounding several portions of dough of the same weight and containing the same ingredients in the same proportions, except that the several portions each contain a different sample of the commercial yeasts being studied. The various samples are treated under the same conditions to make several portions of bread. The several portions of bread are then examined to determine the "flavor figure." The above method of selecting a yeast is believed to be new and constitutes a method whose employment contributes to the objects of our invention in improving the flavor of yeast leavened bread. The "flavor figure", i. e., the number of milligrams of acetyl methyl carbinol per 100 grams of bread crumbs can be determined quantitatively by methods known to skilled chemists. For example the method used in determining this compound in vinegar may be used.

We have found that homologues of acetyl methyl carbinol may be used to replace the said carbinol in whole or in part. In fact any compound of the general formula

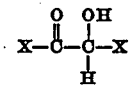

may be used, where X is an alkyl group.

While not wishing to be bound to any particular theory as to the scientific principle underlying our invention, we wish to point out that it is our opinion that the acetyl methyl carbinol which we have formed in or added to the baked food products of the kind herein described slowly oxidizes to diacetyl, and this compound being a volatile substance escapes from the bread or other food product, imparting to it the pleasant aroma. It is pointed out that acetyl methyl carbinol itself is odorless, but has the advantage over diacetyl, previously mentioned, of a much higher boiling point and can be retained in the food during the baking thereof, while the diacetyl is liable to be driven off during the baking process.

As used in the claims, the terms "aeration" or "aerated" include subjecting the sponge or dough to the influence of either oxygen or air, so as to increase the oxygen concentration in the sponge or dough.

We claim:

1. The process of making baked food products of improved flavor which comprises compounding and manipulating the usual ingredients and providing a compound of the general formula

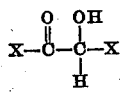

where X is an alkyl group, in the said ingredients prior to the baking operation, and so treating the mixture as to prevent reduction of said compound during the manipulation and baking of said ingredients and baking the said ingredients.

2. The process of making yeast leavened food products of improved flavor in which a compound of the general formula

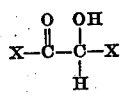

where X is an alkyl group, is incorporated with the usual ingredients and so treating the mixture as to substantially prevent reduction of the said compound to the corresponding glycol.

3. The process of making bakery products of improved flavor in which a compound of the general formula

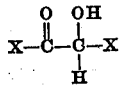

where X is an alkyl group, is incorporated with the usual ingredients.

4. The process of making yeast leavened food products of improved flavor in which acetyl methyl carbinol is incorporated with the usual ingredients and so treating the mixture as to substantially prevent reduction of the said keto carbinol to the corresponding glycol.

5. The process of making yeast leavened food products of improved flavor which comprises preparing a dough, incorporating acetyl methyl carbinol, subjecting the dough to aeration and baking the product.

6. In the process of making bakery products of improved flavor the improvement which comprises incorporating with the usual ingredients a quantity of acetyl methyl carbinol prior to baking the said products.

7. The process of making yeast leavened food products of improved flavor which comprises preparing a dough containing a yeast, incorporating a small quantity of acetyl methyl carbinol and a small quantity of hydrogen acceptor, permitting the said dough to ferment and baking the said dough.

8. The process of making yeast leavened food products of improved flavor which comprises employing the sponge dough method, adjusting the sugar content so that it is twice that of the yeast employed, selecting and adding a yeast found to produce a high flavor figure, subjecting the mixed ingredients to superaeration, carrying out the dough fermentation at a temperature of about 78° F. for 1½ hours, adding a small amount of acetyl methyl carbinol into the dough at some stage prior to baking, and baking the said dough.

9. In the process of making yeast leavened food products of improved flavor by the sponge dough method, the improvement comprising adding 1 to 3 ounces of a 10% solution of acetyl methyl carbinol to each 100 pounds of dough.

10. In the process of making cake of improved flavor, the improvement which comprises incorporating a small amount of acetyl methyl carbinol into a cake batter and then baking the said batter.

11. In the process of making cake of improved flavor, the improvement which comprises incorporating ½ to 1½ ounces of a 10 per cent solution of acetyl methyl carbinol in 100 pounds of cake batter and then baking the said batter.

FRANCISCUS VISSER'T HOOFT.
FREDERIK JOHAN GERRIT DE LEEUW.